(12) United States Patent
Buchanan et al.

(10) Patent No.: US 8,649,710 B2
(45) Date of Patent: *Feb. 11, 2014

(54) TONER CARTRIDGE HAVING A PIVOTING EXIT PORT COVER

(75) Inventors: John Andrew Buchanan, Paris, KY (US); James Anthany Carter, Lexington, KY (US); Keith Seaman, Lexington, KY (US); Michael Leemhuis, Nicholasville, KY (US); Gregory Alan Cavill, Winchester, KY (US); Jonathan David Kelley, Lexington, KY (US); Matthew Lee Rogers, Lexington, KY (US); Tyler Frederick Williams, Georgetown, KY (US); Mark Foster, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/340,797

(22) Filed: Dec. 30, 2011

(65) Prior Publication Data

US 2013/0170861 A1 Jul. 4, 2013

(51) Int. Cl.
*G03G 15/08* (2006.01)

(52) U.S. Cl.
USPC .......................................... 399/258; 399/262

(58) Field of Classification Search
CPC .................................................... G03G 15/08
USPC .................................. 399/258, 260, 262–263
See application file for complete search history.

(56) References Cited

U.S. PATENT DOCUMENTS

| | | |
|---|---|---|
| 5,083,158 A | 1/1992 | Kashima et al. |
| 5,608,501 A | 3/1997 | Makino |
| 5,758,233 A | 5/1998 | Coffey et al. |
| 5,848,342 A | 12/1998 | Tanda |
| 6,128,453 A | 10/2000 | Ban et al. |
| 6,259,874 B1 | 7/2001 | Murakami et al. |
| 6,266,505 B1 | 7/2001 | Ban et al. |
| 6,594,458 B2 | 7/2003 | Ban et al. |
| 6,792,228 B2 | 9/2004 | Ban et al. |

(Continued)

FOREIGN PATENT DOCUMENTS

JP 2000-356895 A 12/2000

OTHER PUBLICATIONS

U.S. Appl. No. 13/420,956, filed Mar. 15, 2012.

(Continued)

*Primary Examiner* — Clayton E Laballe
*Assistant Examiner* — Kevin Butler
(74) *Attorney, Agent, or Firm* — Justin M Tromp

(57) ABSTRACT

A toner cartridge for use in an image forming device according to one example embodiment includes a housing having a reservoir for containing toner therein. The housing has an exit port in fluid communication with the reservoir. A cover is mounted on an exterior portion of the housing that is pivotable between a closed position blocking the exit port and an open position unblocking the exit port. The cover is biased toward the closed position. An actuation mechanism is operatively connected to the cover to open the cover upon being actuated by an engagement feature in the image forming device.

19 Claims, 19 Drawing Sheets

(56) References Cited

U.S. PATENT DOCUMENTS

| | | |
|---|---|---|
| 6,853,828 B2 | 2/2005 | Ban et al. |
| 6,968,139 B2 | 11/2005 | Ban et al. |
| 6,978,101 B2 | 12/2005 | Ban et al. |
| 7,386,250 B2 | 6/2008 | Ban et al. |
| 7,421,234 B2 * | 9/2008 | Ikeda et al. ............. 399/262 |
| 7,548,710 B2 | 6/2009 | Gayne et al. |
| 7,606,520 B2 | 10/2009 | Dawson |
| 8,165,505 B2 * | 4/2012 | Kojima ..................... 399/258 |
| 2005/0169672 A1 | 8/2005 | Ban et al. |
| 2006/0171744 A1 | 8/2006 | Ikeda et al. |
| 2007/0003325 A1 | 1/2007 | Jung et al. |
| 2008/0101821 A1 * | 5/2008 | Gayne et al. ............. 399/258 |
| 2009/0142103 A1 * | 6/2009 | Chaudhuri et al. ....... 399/262 |
| 2013/0170864 A1 | 7/2013 | Newman et al. |
| 2013/0170865 A1 | 7/2013 | Carter et al. |
| 2013/0170866 A1 | 7/2013 | Carter et al. |
| 2013/0170868 A1 | 7/2013 | Acosta et al. |

OTHER PUBLICATIONS

Copending U.S. Appl. No. 13/723,888, filed Dec. 21, 2012 and U.S. Appl. No. 13/780,042, filed Feb. 28, 2013.

International Search Report and Written Opinion of the International Searching Authority dated Jan. 28, 2013 for PCT Application No. PCT/US12/65147 (12 pages).

International Search Report and Written Opinion of the International Searching Authority dated Jan. 31, 2013 for PCT Application No. PCT/US12/65152 (6 pages).

International Search Report and Written Opinion of the International Searching Authority dated Jan. 31, 2013 for PCT Application No. PCT/US12/65149 (7 pages).

Copending U.S. Appl. No. 13/919,015, filed Jun. 17, 2013.

Copending U.S. Appl. No. 13/919,021, filed Jun. 17, 2013.

Prosecution history of copending U.S. Appl. No. 13/420,956 including Non-Final Office Action dated Sep. 9, 2013.

* cited by examiner

TONER CARTRIDGE HAVING A PIVOTING EXIT PORT COVER

CROSS REFERENCES TO RELATED APPLICATIONS

None

BACKGROUND

1. Field of the Disclosure

The present disclosure relates generally to toner cartridges used in electrophotographic image forming devices and, more particularly, to a toner cartridge having a pivoting exit port cover.

2. Description of the Related Art

In order to reduce the premature replacement of components traditionally housed within a toner cartridge for an image forming device, toner cartridge manufacturers have begun to separate components having a longer life from those having a shorter life into separate replaceable units. Relatively longer life components such as a developer roll, a toner adder roll, a doctor blade and a photoconductive drum are positioned in one replaceable unit (an "imaging unit"). The image forming device's toner supply, which is consumed relatively quickly in comparison with the components housed in the imaging unit, is provided in a reservoir in a separate replaceable unit in the form of a toner cartridge that mates with the imaging unit. In this configuration, the number of components housed in the toner cartridge is reduced in comparison with traditional toner cartridges. As a result, in systems utilizing a separate toner cartridge and imaging unit, the toner cartridge is often referred to as a "toner bottle" even though the toner cartridge is more complex than a mere bottle for holding toner.

To deliver toner from the toner cartridge to the imaging unit, an auger in the toner cartridge may be used to feed toner from an exit port on the toner cartridge into an entrance port on the imaging unit and into a second auger that disperses the toner within the imaging unit. As the toner is drawn out of the toner cartridge, it is augured through a shutter used for sealing the exit port of the toner cartridge when it is not inserted in the printer.

Image forming devices having a separate toner cartridge and imaging unit are susceptible to leakage of toner between the exit port of the toner cartridge and the entrance port of the imaging unit. Toner leakage is commonly experienced when the toner cartridge is separated from the imaging unit and removed from the image forming device. Toner leakage may be experienced even when the shutter is closed as a result of toner buildup outside the shutter, in and around the exit port. When this occurs, leaked toner may fall from the toner cartridge into the image forming device or onto surfaces surrounding the image forming device, such as a desktop or a user's clothing, resulting in uncleanliness. Further, when leaked toner falls into the internal portions of the image forming device, it can cause reliability issues and, in some cases, print defects.

One solution to the issue of toner leakage between the toner cartridge and imaging unit is to mask the problem by positioning the interface between the toner cartridge and the imaging unit in an area within the image forming device that the customer does not interact with. However, this solution does not address the issues of reliability and print defects. Foam has also been used to soak up leaked toner. However, this solution is only useful where the foam is in a position to contact the leaked toner and where small amounts of toner are leaked. Otherwise, the foam is unable to soak up the leaked toner. A sliding cover has also been employed to cover the exit port of the toner cartridge in an attempt to trap any loose toner within the toner cartridge. The sliding cover is biased in the closed position.

When the toner cartridge is inserted into the image forming device and mated with the imaging unit, the sliding cover is engaged by a portion of the imaging unit that overcomes the bias and causes it to retract into an open position revealing the exit port of the toner cartridge. When the toner cartridge is separated from the imaging unit and removed from the image forming device, the cover slides into the closed position as a result of the bias. In some instances, the sliding cover contributes to toner leakage by pushing or skiving toner off the portion of the toner cartridge surrounding the exit port as the cover slides closed. Accordingly, it will be appreciated that an exit port cover that effectively prevents toner leakage is desired.

SUMMARY

A toner cartridge for use in an image forming device according to one example embodiment includes a housing having a reservoir for containing toner therein. The housing has an exit port in fluid communication with the reservoir. A cover is mounted on an exterior portion of the housing that is pivotable between a closed position blocking the exit port and an open position unblocking the exit port. The cover is biased toward the closed position. An actuation mechanism is operatively connected to the cover to open the cover upon being actuated by an engagement feature in the image forming device.

A toner cartridge for use in an image forming device having an imaging unit separate from the toner cartridge removably installed therein according to one example embodiment includes a housing having a reservoir for containing toner therein. An exit port is positioned on a front portion of the housing in fluid communication with the reservoir. A shutter is positioned at the exit port that is movable between an open position to permit toner from the reservoir to pass out of the exit port and a closed position to prevent toner from passing out of the exit port. The shutter is biased toward the closed position. A cover is mounted on an exterior portion of the housing that is pivotable between a closed position where the cover is pressed against the exit port to trap residual toner and an open position where the cover is pivoted away from the exit port to expose the exit port. The cover is biased toward the closed position. A foam member is positioned on an inner face of the cover to soak up residual toner. An actuation mechanism is attached to the housing and operatively connected to the cover. When the toner cartridge is inserted in the image forming device, an engagement feature on the imaging unit engages the actuation mechanism causing the cover to pivot from the closed position to the open position.

BRIEF DESCRIPTION OF THE DRAWINGS

The above-mentioned and other features and advantages of the various embodiments, and the manner of attaining them, will become more apparent and will be better understood by reference to the accompanying drawings.

DETAILED DESCRIPTION

Figure 1:
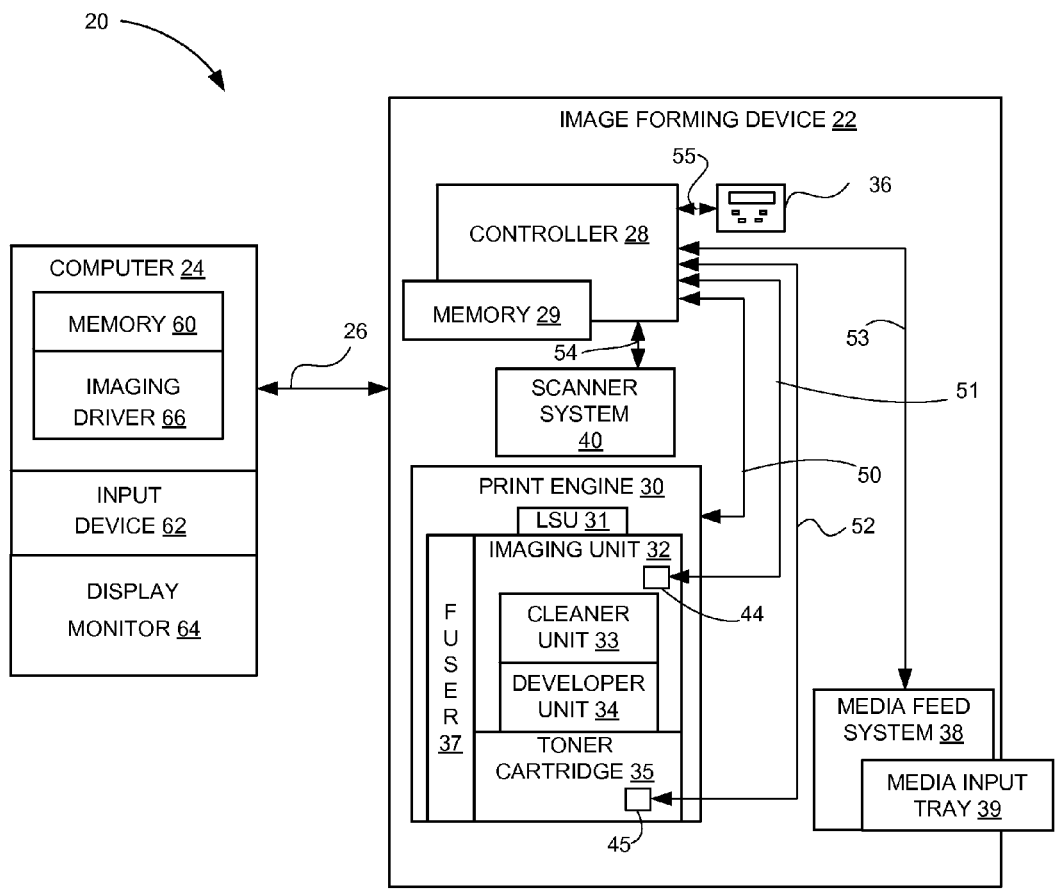
FIG. 1 is a block diagram of an imaging system according to one example embodiment.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back", "rear" and "side" "under", "below", "lower", "over", "upper", and the like, are used for ease of description to explain the positioning of one element relative to a second element. These terms are generally used in reference to the position of an element in its intended working position within an image forming device. Further, terms such as "first", "second", and the like, are used to describe various elements, regions, sections, etc. and are not intended to be limiting. The term "image" as used herein encompasses any printed or digital form of text, graphic, or combination thereof. Like terms refer to like elements throughout the description.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 32, a toner cartridge 35, a user interface 36, a media feed system 38, a media input tray 39 and a scanner system 40. Image forming device 22 may communicate with computer 24 via a standard communication protocol, such as for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated memory 29 and may be formed as one or more Application Specific Integrated Circuits (ASICs). Memory 29 may be any volatile or non-volatile memory of combination thereof such as, for example, random access memory (RAM), read only memory (ROM), flash memory and/or non-volatile RAM (NVRAM). Alternatively, memory 29 may be in the form of a separate electronic memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 32 and processing circuitry 44 thereon via a communications link 51.

Controller 28 communicates with toner cartridge 35 and processing circuitry 45 therein via a communications link 52. Controller 28 communicates with media feed system 38 via a communications link 53. Controller 28 communicates with scanner system 40 via a communications link 54. User interface 36 is communicatively coupled to controller 28 via a communications link 55. Processing circuitry 44, 45 may provide authentication functions, safety and operational interlocks, operating parameters and usage information related to imaging unit 32 and toner cartridge 35, respectively. Controller 28 processes print and scan data and operates print engine 30 during printing and scanner system 40 during scanning.

Computer 24, which is optional, may be, for example, a personal computer, including memory 60, such as RAM, ROM, and/or NVRAM, an input device 62, such as a to keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes laser scan unit (LSU) 31, toner cartridge 35, imaging unit 32, and fuser 37, all mounted within image forming device 22. Imaging unit 32 is removably mounted in image forming device 22 and includes a developer unit 34 that houses a toner sump and a toner delivery system. The toner delivery system includes a toner adder roll that provides toner from the toner sump to a developer roll. A doctor blade provides a metered uniform layer of toner on the surface of the developer roll. Imaging unit 32 also includes a cleaner unit 33 that houses a photoconductive drum and a waste toner removal system. Toner cartridge 35 is also removably mounted in imaging unit 32 in a mating relationship with developer unit 34 of imaging unit 32. An exit port on toner cartridge 35 communicates with an entrance port on developer unit 34 allowing toner to be periodically transferred from toner cartridge 35 to resupply the toner sump in developer unit 34.

The electrophotographic printing process is well known in the art and, therefore, is described briefly herein. During a printing operation, laser scan unit 31 creates a latent image on the photoconductive drum in cleaner unit 33. Toner is transferred from the toner sump in developer unit 34 to the latent image on the photoconductive drum by the developer roll to create a toned image. The toned image is then transferred to a media sheet received in imaging unit 32 from media input tray 39 for printing. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
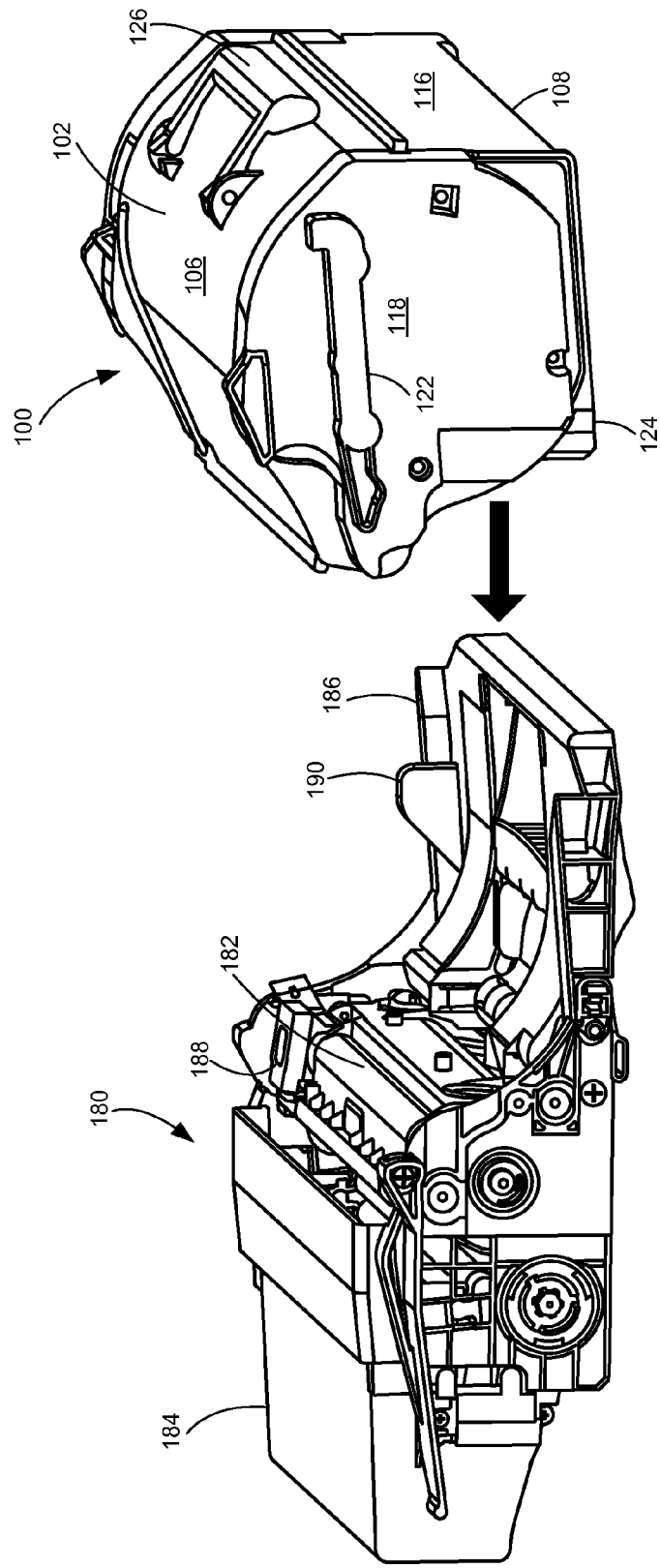
FIG. 2 is a perspective view of a toner cartridge and an imaging unit according to one example embodiment.
Figure 3:
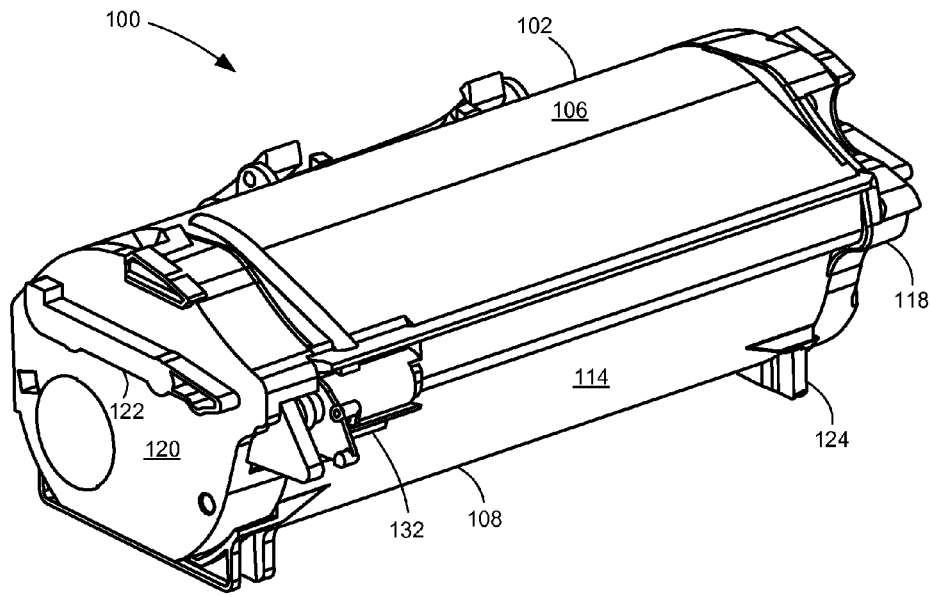
FIGS. 3 and 4 are additional perspective views of the toner cartridge shown in FIG. 2.
Figure 4:
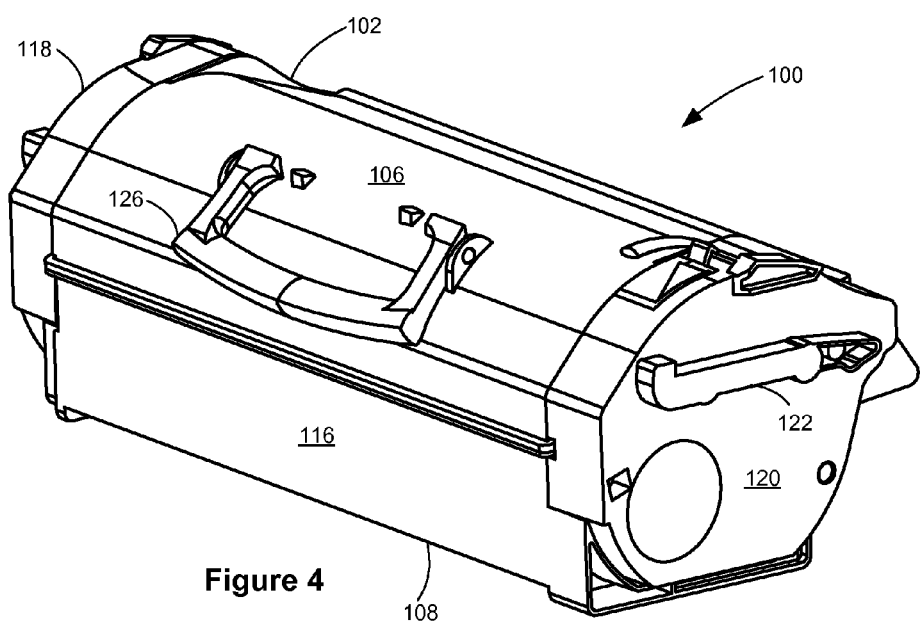

Referring now to FIG. 2, a toner cartridge 100 and an imaging unit 180 are shown according to one example embodiment. Imaging unit 180 includes a developer unit 182 and a cleaner unit 184 mounted on a common frame 186. As discussed above, imaging unit 180 and toner cartridge 100 are each removably installed in image forming device 22. Imaging unit 180 is first slidably inserted into image forming device 22. Toner cartridge 100 is then inserted into image forming device 22 and onto frame 186 in a mating relationship with developer unit 182 of imaging unit 180 as indicated by the arrow shown in FIG. 2. This arrangement allows toner cartridge 100 to be removed and reinserted easily when replacing an empty toner cartridge without having to remove imaging unit 180. Imaging unit 180 may also be readily removed as desired in order to maintain, repair or replace the components associated with developer unit 182, cleaning unit 184 or frame 186 or to clear a media jam.

With reference to FIGS. 2-5, toner cartridge 100 includes a housing 102 having an enclosed reservoir 104 (FIG. 5) for holding a quantity of toner therein. Housing 102 may be viewed as having a top or lid 106 mounted on a base 108. Base 108 includes first and second side walls 110, 112 connected to adjoining front and rear walls 114, 116. In one embodiment, top 106 is ultrasonically welded to base 108 thereby forming enclosed reservoir 104. First and second end caps 118, 120 are mounted to side walls 110, 112, respectively, and include guides 122 to assist the insertion of toner cartridge 100 into image forming device 22 for mating with developer unit 182. First and second end caps 118, 120 may be snap fitted into place or attached by screws or other fasteners. Guides 122 travel in corresponding channels within image forming device 22. Legs 124 may also be provided on a bottom portion of base 106 or end caps 118, 120 to assist with the insertion of toner cartridge 100 into image forming device 22. Legs 124 are received by a corresponding slot or channel in frame 186 to facilitate the mating of toner cartridge 100 with developer unit 182. A handle 126 may be provided on top 106 or base 108 of toner cartridge 100 to assist with insertion and removal of toner cartridge 100 from imaging unit 180 and image forming device 22. As shown in FIG. 6, a fill port 128 is provided on side wall 112 that is used to fill toner cartridge 100 with toner. After filling, fill port 128 is closed by a plug 130 and/or cap 132.

Figure 5:
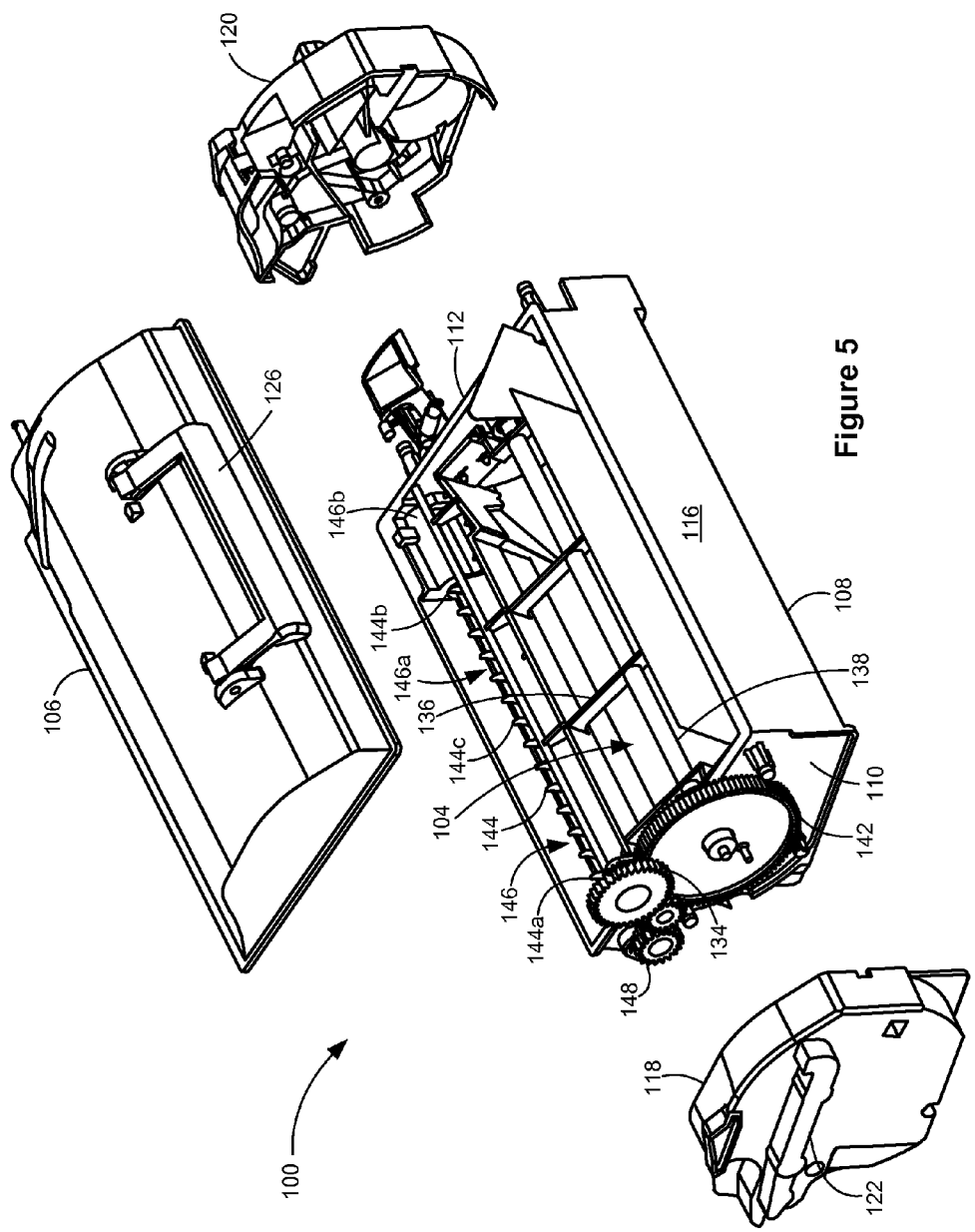
FIGS. 5 and 6 are exploded views of the toner cartridge shown in FIG. 2 showing a reservoir for holding toner therein.
Figure 6:
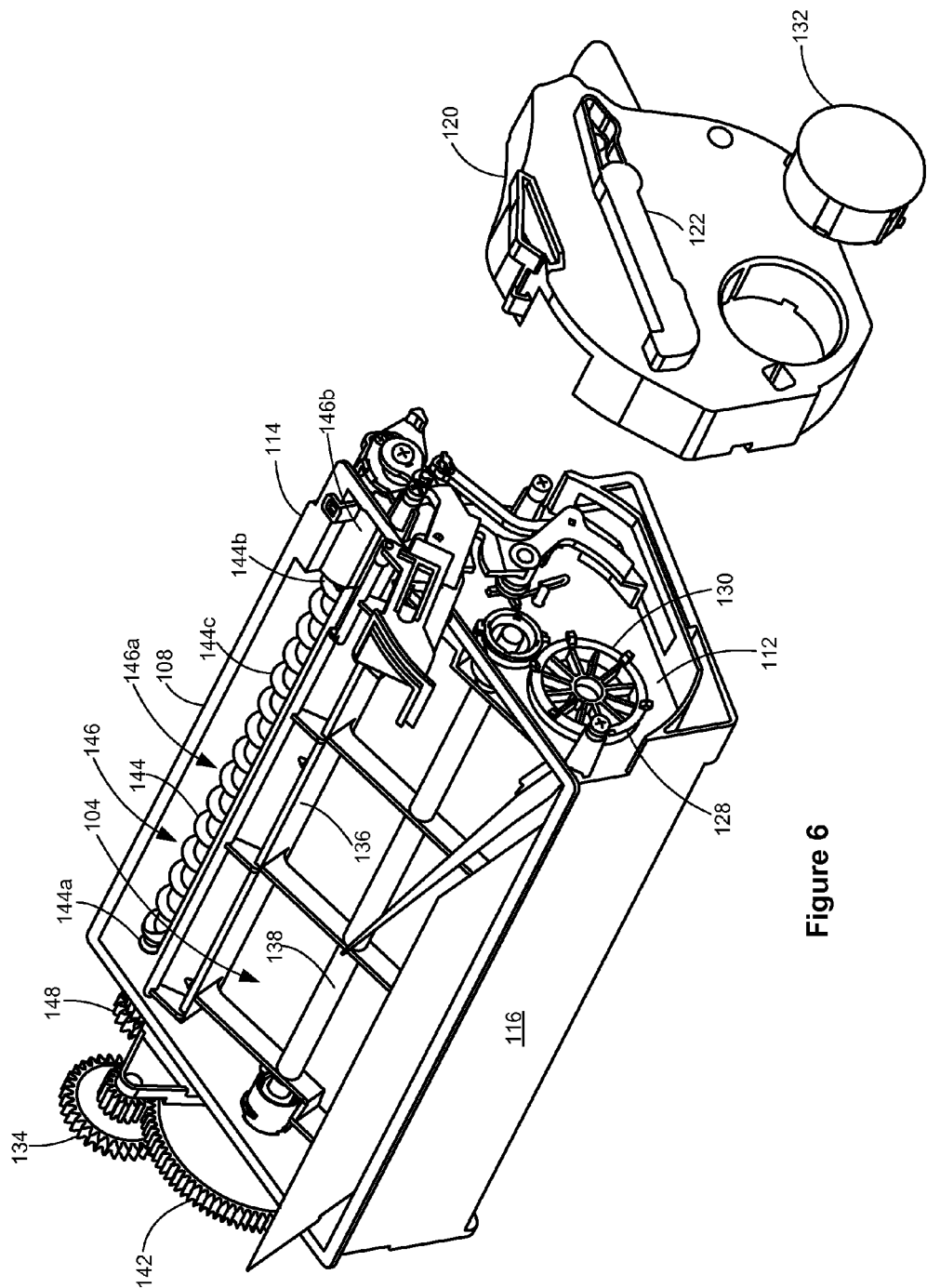

With reference to FIG. 5, various drive gears are housed within a space formed between end cap 118 and side wall 110. A main interface gear 134 engages with a drive system in image forming device 22 that provides torque to main interface gear 134. As discussed in greater detail below, various linkages are housed within a space formed between end cap 120 and side wall 112. One or more paddles 136 are rotatably mounted within toner reservoir 104 with first and second ends of a drive shaft 138 of paddle(s) 136 extending through aligned openings in side walls 110, 112, respectively. A drive gear 142 is provided on the first end of drive shaft 138 that engages with main interface gear 134 either directly or via one or more intermediate gears. Bushings may be provided one each end of drive shaft 138 where it passes through side walls 110, 112. Accordingly, side wall 110 may also be termed the "drive" or "driven" side of toner cartridge 100.

With reference to FIGS. 5 and 6, an auger 144 having first and second ends 144a, 144b, and a spiral screw flight 144c is positioned in a channel 146 extending along the width of front wall 114 between side walls 110, 112. Channel 146 may be integrally molded as part of front wall 114 or formed as a separate component that is attached to front wall 114. Channel 146 is generally horizontal in orientation along with toner cartridge 100 when toner cartridge 100 is installed in image forming device 22. First end 144a of auger 144 extends through side wall 110 and a drive gear 148 is provided on first end 144a that engages with main interface gear 134 either directly or via one or more intermediate gears. Channel 146 includes an open portion 146a and an enclosed portion 146b. Open portion 146a is open to toner reservoir 104 and extends from side wall 110 toward second end 144b of auger 144. Enclosed portion 146b of channel 146 extends from side wall 112 and encloses a shutter assembly 150 (FIG. 7) and second end 144b of auger 144. As paddle(s) 136 rotate, they deliver toner from toner reservoir 104 into open portion 146a of channel 146. Auger 144 is rotated via drive gear 148 to deliver toner received in channel 146 to shutter assembly 150.

Figure 7:
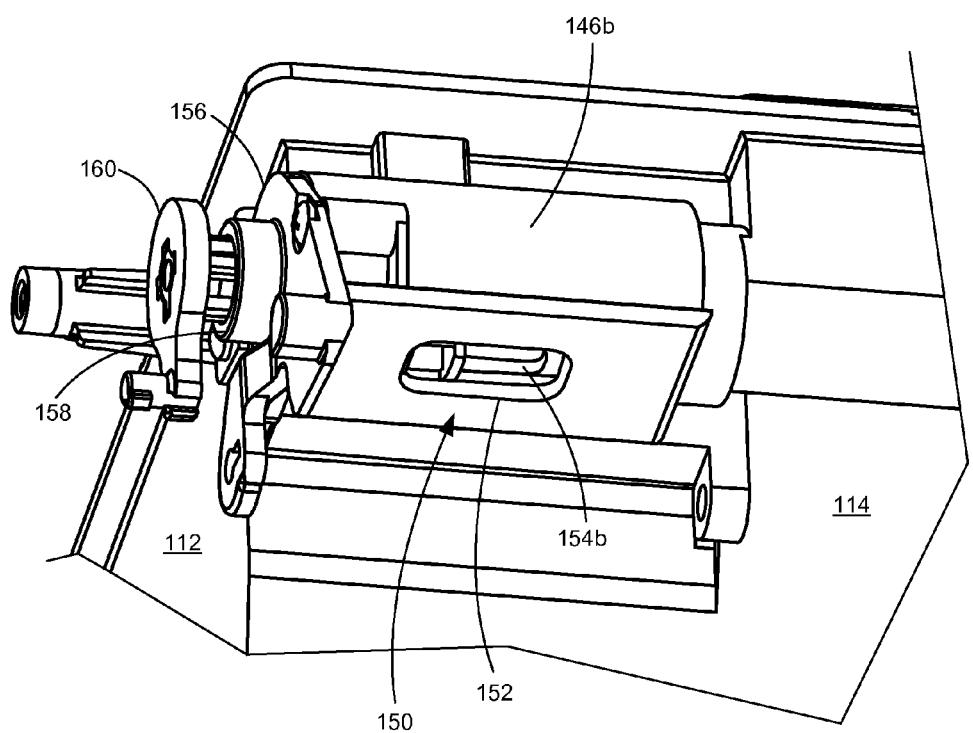
FIG. 7 is a perspective view of a front portion of the toner cartridge shown in FIG. 2 showing an exit port thereof.

Shutter assembly 150 regulates whether toner is permitted to exit toner cartridge 100 through an exit port 152 provided in front wall 114 and shown in FIG. 7. In this embodiment, exit port 152 is disposed at the bottom of channel 146 so that gravity will assist in exiting toner through exit port 152.

Shutter assembly 150 is shown in more detail in FIGS. 8A, 8B, 9A and 9B. Shutter assembly 150 includes a shutter 154 that is rotatable between a closed position shown in FIGS. 8A and 9A and an open position shown in FIGS. 8B and 9B. Shutter 154 includes an open end 154a that receives second end 144b of auger 144 therein. As auger 144 rotates, it delivers toner from channel 146 to shutter 154. Shutter 154 includes a radial opening 154b that is connected to open end 154a by an internal channel in shutter 154. Radial opening 154b permits toner to exit toner cartridge 100 through exit port 152 as discussed in greater detail below.

A retaining member 156 is mounted on side wall 112 of toner cartridge 100 (FIG. 7). In the example embodiment illustrated, retaining member 156 is a separate component attached to housing 102; however, retaining member 156 may also be integrally molded as part of housing 102. Retaining member 156 includes a bushing 158 that receives a closed end 154c of shutter 154. Closed end 154c of shutter 154 is connected to a lever 160 that opens and closes shutter 154. In the example embodiment illustrated, closed end 154c of shutter 154 includes a key 162 and lever 160 includes a corresponding keyway 164. Key 162 and keyway 164 couple shutter 154 to lever 160 such that the rotation of lever 160 opens and closes shutter 154. It will be appreciated that this configuration may be reversed so that lever 160 includes a key and closed end 154c includes a corresponding keyway. In the embodiment illustrated, lever 160 is connected to closed end 154c via a fastener 166 that passes through keyway 164 and a threaded hole 168 in closed end 154c; however, lever 160 and shutter 154 may be connected by any suitable means such as by being snap fit together.

Figure 8A:
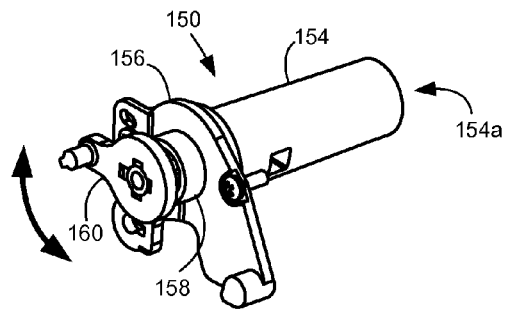
FIGS. 8A and 8B are perspective views of a shutter assembly for use with the toner cartridge in a closed position and an open position, respectively, according to one example embodiment.
Figure 8B:
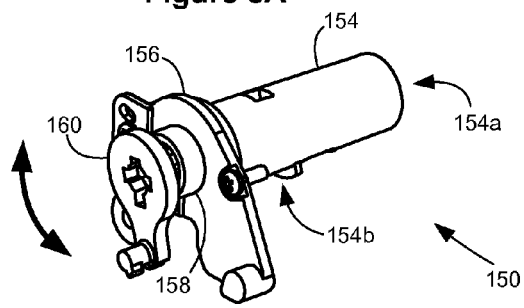
Figure 9A:
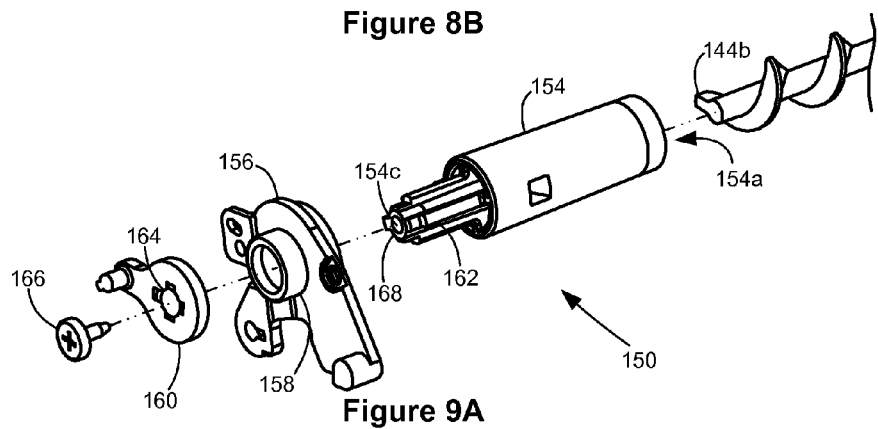
FIGS. 9A and 9B are exploded views of the shutter assembly shown in FIGS. 8A and 8B.
Figure 9B:
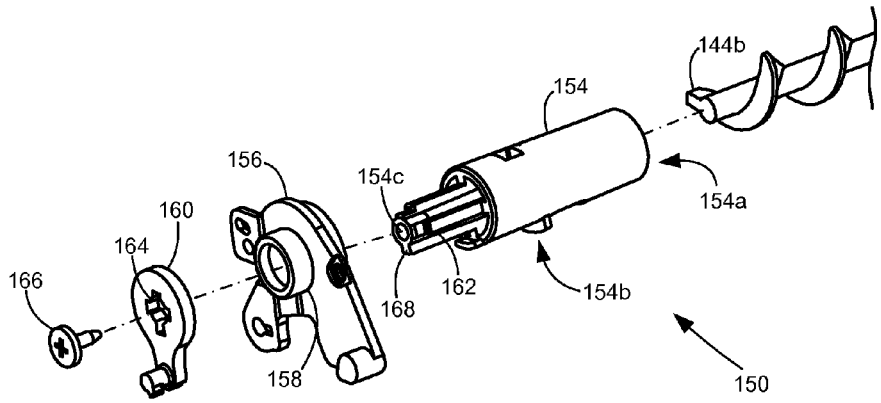

When lever 160 is in a first position shown in FIGS. 8A and 9A, shutter 154 is in a closed position with radial opening 154b positioned against an internal surface of enclosed portion 146b of channel 146 in order to prevent toner from exiting toner cartridge 100. When lever 160 rotates to a second position shown in FIGS. 8B and 9B, shutter 154 rotates to an open position where radial opening 154b is aligned with exit port 152 to permit toner to exit toner cartridge 100. When shutter 154 is in the open position, toner may be delivered from reservoir 104 of toner cartridge 100 to imaging unit 180 by rotating paddle(s) 136 and auger 144 as desired. Specifically, as paddle(s) 136 rotate, they deliver toner from toner reservoir 104 into open portion 146a of channel 146. As auger 144 rotates, it delivers toner received in channel 146 to shutter 154 through open end 154a. Toner passes through the internal channel in shutter 154 and out of radial opening 154b and exit port 152 into a corresponding entrance port 188 in developer unit 182 (FIG. 2).

Lever 160 may be rotated to open or close shutter 154 by any suitable method known in the art. For example, it will be appreciated that shutter 154 preferably remains closed unless toner cartridge 100 is installed in image forming device 22. Accordingly, in one embodiment, lever 160 and shutter 154 are biased toward the closed position by a biasing member such as a spring. Lever 160 and shutter 154 may be rotated to the open position as toner cartridge 100 reaches its final position in image forming device 22 by an opposing force provided by an element on imaging unit 180 or image forming device 22. For example, a pin or other type of projection on imaging unit 180 or image forming device 22 may engage lever 160 or a mechanical linkage thereto to rotate lever 160 as toner cartridge 100 reaches its final position. Further, lever 160 and shutter 154 may be rotated to the open position when a door in image forming device 22 permitting access to toner cartridge 100 is closed. For example, a plunger or other projection extending from an internal portion of the door may engage lever 160 or a mechanical linkage thereto to provide the opposing force. A combination of these methods may also be used as desired. Lever 160 may also be rotated by a solenoid or drive transmission provided on side wall 112 of toner cartridge 100. The solenoid or drive transmission may be actuated by a drive mechanism in image forming device 22.

Figure 10:
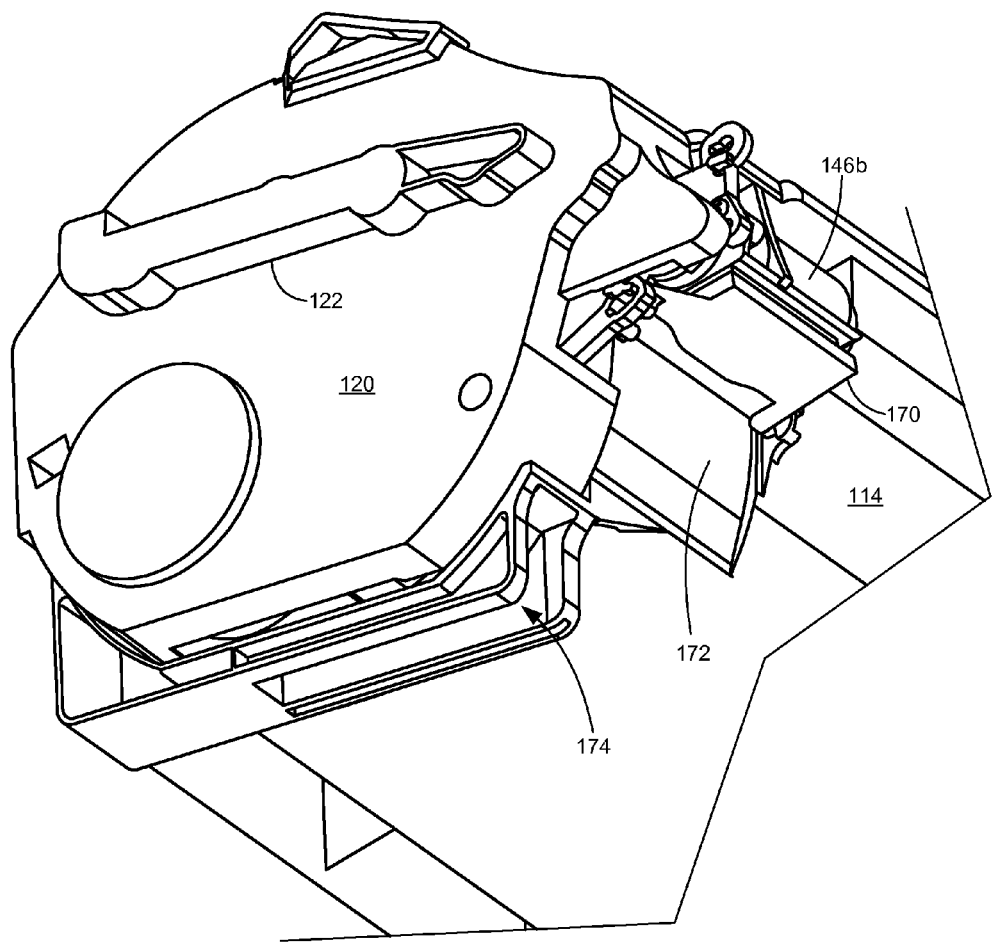
FIG. 10 is a perspective view of a toner cartridge having a pivoting exit port cover according to one example embodiment.
Figure 11:
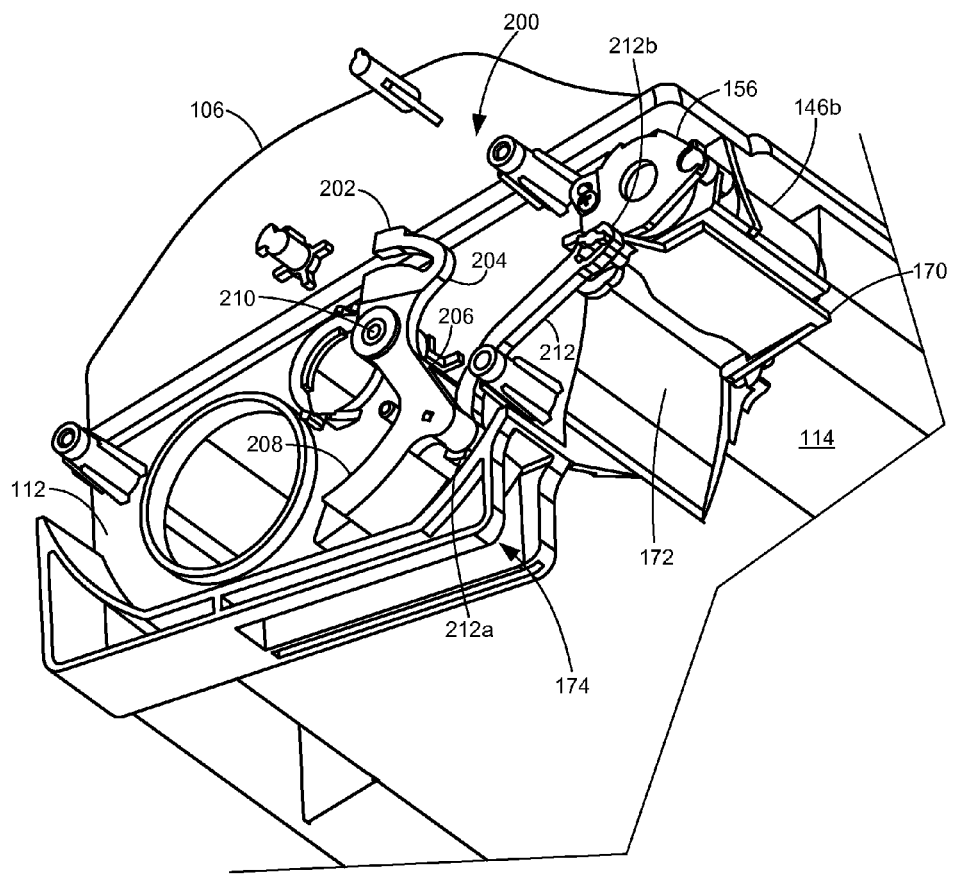
FIG. 11 is a perspective view of the toner cartridge shown in FIG. 10 with an end cap removed showing the cover in a closed position and an assembly for actuating the to cover.
Figure 12:
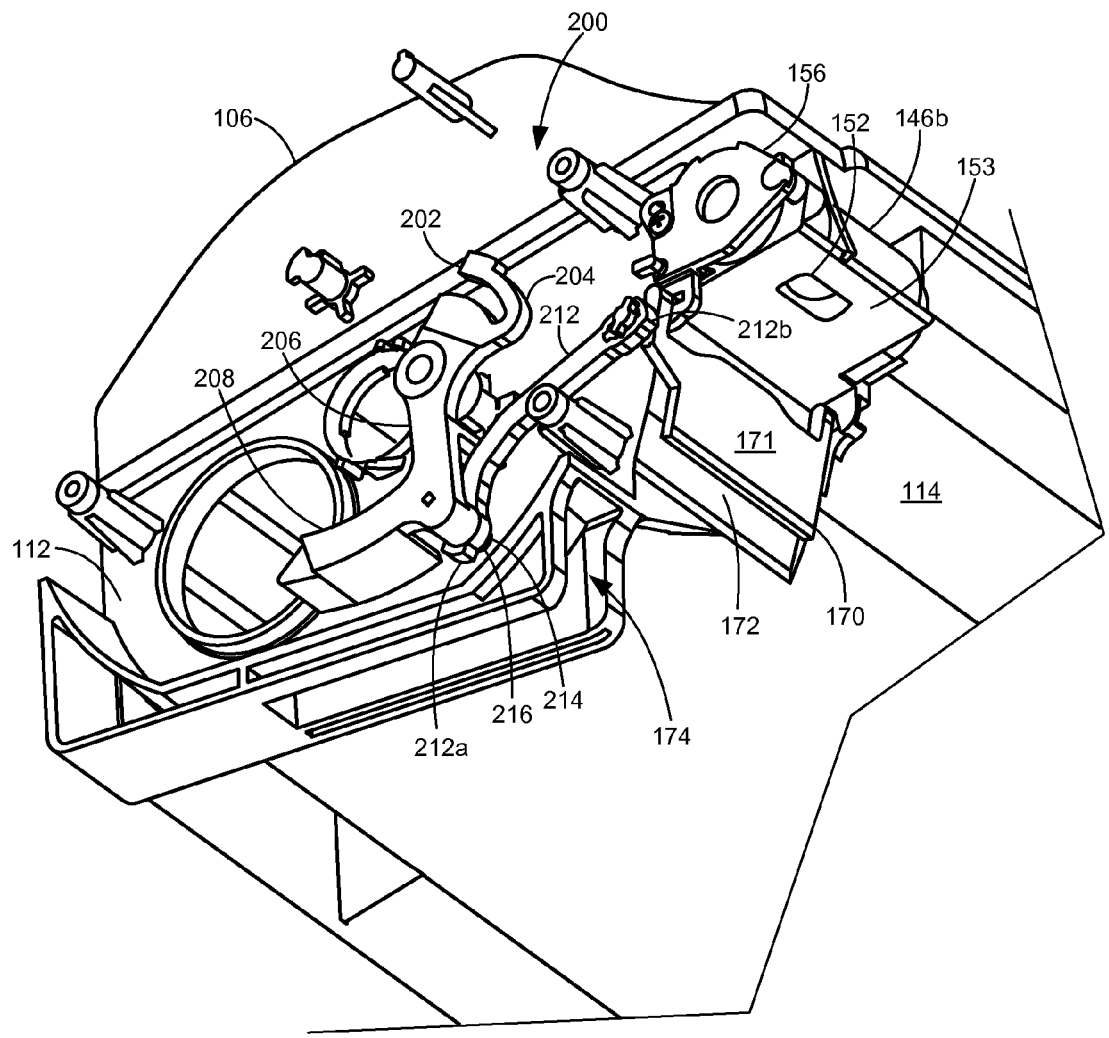
FIG. 12 is a perspective view of the toner cartridge shown in FIG. 10 with an end cap removed showing the cover in an open position and an assembly for actuating the cover.

With reference to FIGS. 10-12, a cover 170 is provided on toner cartridge 100 that is pivotable between a closed position illustrated in FIGS. 10 and 11 and an open position illustrated in FIG. 12. FIGS. 11 and 12 show toner cartridge 100 with end cap 120 removed to more clearly illustrate the components housed between end cap 120 and side wall 112. In the closed position shown in FIGS. 10 and 11, cover 170 is pressed against exit port 152 and its surrounding surface 153 (FIG. 12) to trap any residual toner within exit port 152 and prevent toner leakage. In the open position shown in FIG. 12, cover 170 is pivoted away from exit port 152 to permit toner to travel from exit port 152 into entrance port 188 of developer unit 182 (FIG. 2). In the example embodiment illustrated, in the open position, cover 170 retracts into a recess 172 in front wall 114 that is sized and shaped to receive cover 170. This prevents cover 170 from applying an undesired force on developer unit 182 when toner cartridge 100 and imaging unit 180 are mated. It will be appreciated that developer unit 182 is precisely aligned to ensure proper toner transfer from the toner sump therein to the photoconductive drum housed in cleaner unit 184. Print defects may occur if this alignment is disturbed, such as by a force applied by cover 170 on developer unit 182. When cover 170 pivots from the open position to the closed position to cover exit port 152, it applies a sealing force that is substantially normal to exit port 152 with little to no sliding motion. This allows cover 170 to capture any toner present in or around exit port 152 without scraping or skiving it into image forming device 22 thereby reducing the amount of toner leakage. Cover 170 includes a piece of foam 171 on an inner face thereof that soaks up toner present on or around exit port 152. For example, foam 171 may include a flexible, open cell, polymer (e.g., polyurethane) foam, such as SUPER SEAL FOAM available from FXI, Media, Pennsylvania, USA.

In one embodiment, cover 170 is actuated when toner cartridge 100 is installed in image forming device 22 and, more particularly, when toner cartridge 100 is mated with imaging unit 180. This ensures that cover 170 is in the open position and exit port 152 is accessible when toner cartridge 100 is installed in the machine. When toner cartridge 100 is removed, cover 170 is in the closed position covering exit port 152 in order to prevent toner leakage. In this embodiment, cover 170 is biased toward the closed position. As discussed in greater detail below, as toner cartridge 100 is installed in image forming device 22, a projection or other engagement feature on image forming device 22 or imaging unit 180 engages cover 170 or a linkage thereto and provides a force sufficient to overcome the biasing force in order to open cover 170 to permit toner to flow from toner cartridge 100 to imaging unit 180. When toner cartridge 100 is removed from image forming device 22, the engagement between the engagement feature and cover 170 or the linkage thereto is broken causing cover 170 to close as a result of the bias.

FIGS. 11 and 12 illustrate one example embodiment of an assembly 200 for actuating cover 170 when it is inserted into or removed from image forming device 22. Assembly 200 includes a rotatable linkage member 202 pivotally attached to side wall 112 at an axis of rotation 210. Linkage member 202 includes a first leg 204 and a second leg 206 that each extend radially from axis of rotation 210. A third leg 208 extends in a curved manner from second leg 206 at an angle that is roughly perpendicular to second leg 206. Third leg 208 includes a curved engagement surface 209 on a front portion thereof that contacts a corresponding engagement feature when toner cartridge 100 is inserted into image forming 22 to actuate assembly 200 and open cover 170. A lifting link 212 is connected to linkage member 202 at a first end 212a of lifting link 212. In the example embodiment illustrated, lifting link 212 is a curvilinear bar. In this embodiment, a post 214 extends from second leg 206 of linkage member 202 near the point where third leg 208 extends from second leg 206 (FIG. 12). Post 214 is received by a corresponding channel 216 in first end 212a of lifting link 212 (FIG. 12). In this embodiment, post 214 is rotatable within channel to 216 to provide a greater range of motion between lifting link 212 and linkage member 202.

However, it will be appreciated that linkage member 202 and lifting link 212 may be connected by any suitable means such as, for example, by reversing the post/channel configuration such that lifting link 212 includes a post and linkage member 202 includes a corresponding channel. Further, lifting link 212 and linkage member 202 may be connected at any suitable point along linkage member 202 or lifting link 212 as long as the rotation of linkage member 202 translates into the opening and closing of cover 170. A second end 212b of lifting link 212 is attached to cover 170 as discussed in greater detail below.

Figure 13:
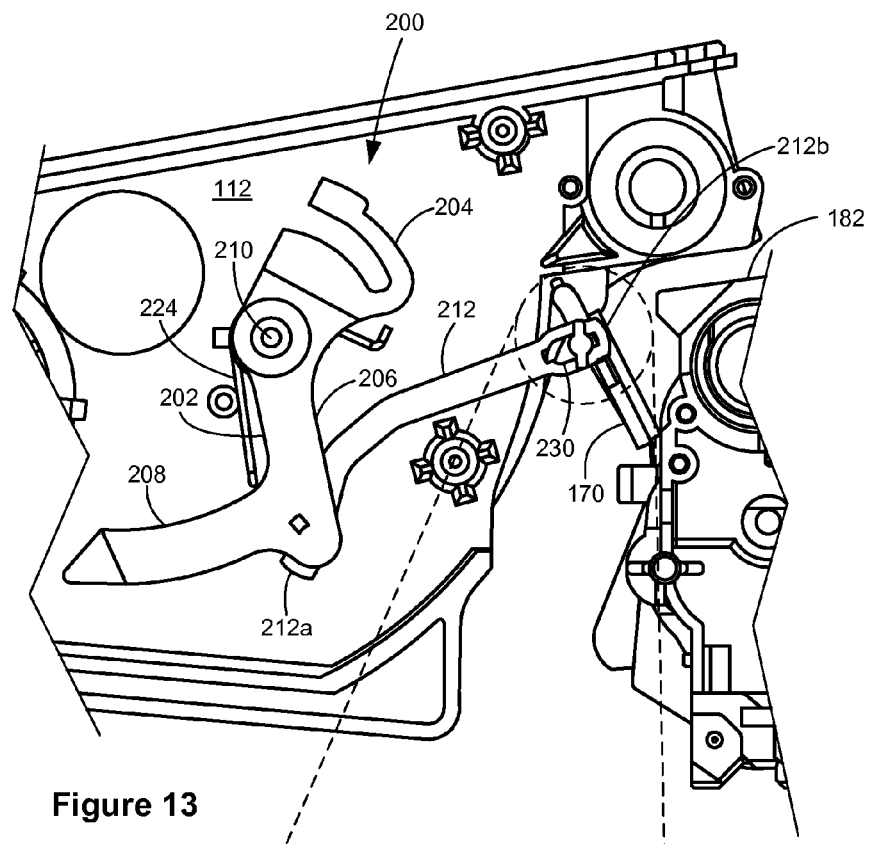
FIG. 13 is a side elevation view of the toner cartridge and assembly shown in FIGS. 11 and 12 showing the cover between the closed position and the open position as the toner cartridge is mated with a developer unit.
Figure 14:
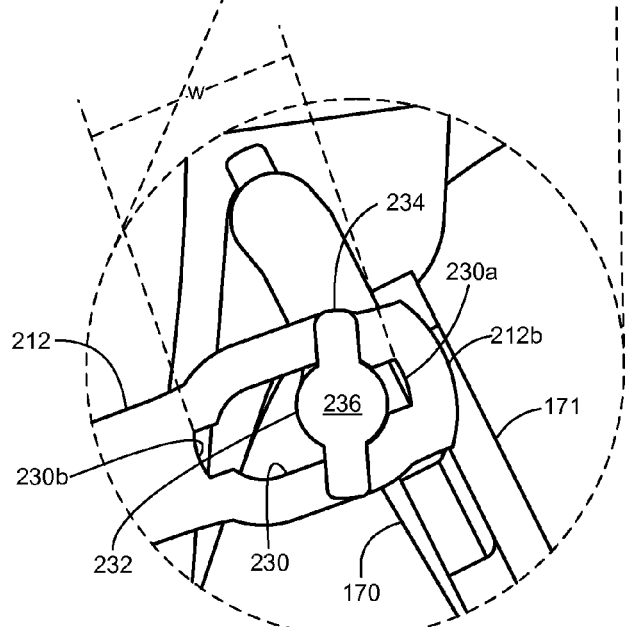
FIG. 14 is a close-up view of a lifting link of the assembly in shown FIG. 13 having an elongated slot therein.
Figure 15:
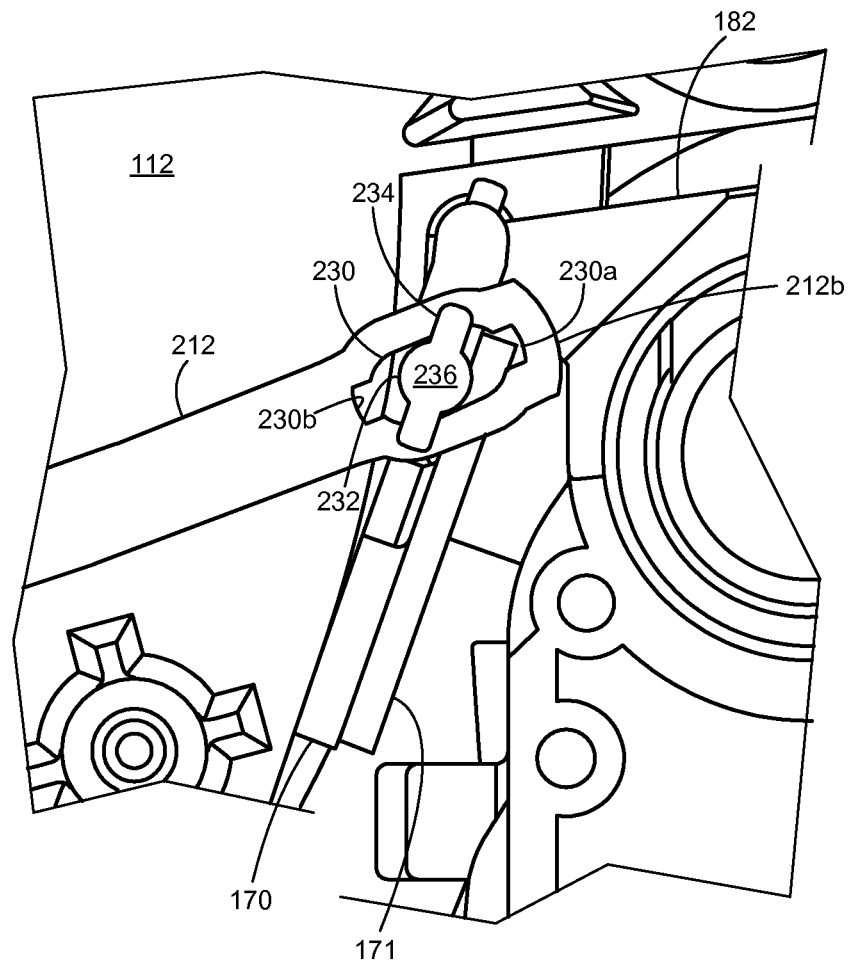
FIG. 15 is a side elevation view of the assembly shown in FIG. 13 showing the cover in the open position.

With reference to FIGS. 13-15, as discussed above, it is preferred that cover 170 does not apply a force on developer unit 182 when toner cartridge 100 and imaging unit 180 are mated in their final positions. Accordingly, in the example embodiment illustrated, second end 212b of lifting link 212 includes a slot 230 therein that receives a post 232 extending from cover 170. Slot 230 has a width W that is greater than the diameter of post 232. This allows post 232 to float between a front portion 230a of slot 230 and a rear portion 230b of slot 230. Post 232 includes one or more radial extensions 234 on an end 236 thereof that retain post 232 in slot 230 to maintain the connection between cover 170 and lifting link 212. As shown in FIG. 15, when cover 170 is rotated to the open position, post 232 is able to slide in slot 230 to substantially eliminate any force applied on developer unit 182 by cover 170. In this manner, cover 170 may rest on developer unit 182 when in the open position but the additional clearance provided by slot 230 prevents cover 170 from being biased against developer unit 182 such that there is substantially no force applied by cover 170 on developer unit 182 except for the negligible force resulting from the weight of cover 170.

A biasing member such as, for example, a spring 224 (partially hidden by linkage member 202 in FIG. 13) biases cover 170 toward the closed position. In the example embodiment illustrated, spring 224 is a torsion spring positioned at the axis of rotation 210 of linkage member 202. However, it will be appreciated that one or more biasing members may be provided at any suitable location(s) in actuation assembly 200 as desired. Side wall 112 and/or an inner surface of end cap 120 may include guide features to limit the travel of the components making up assembly 200 to ensure that they maintain their desired alignment.

Figure 16A:
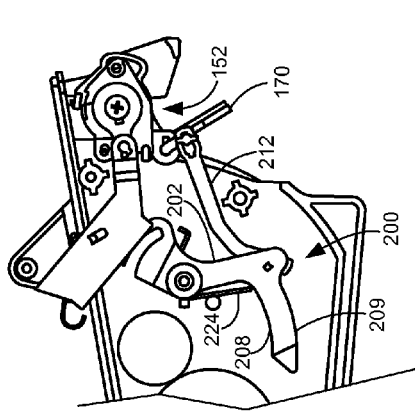
FIGS. 16A-F are sequential views showing the actuation of the assembly shown in FIGS. 12-15 to open the exit port cover.
Figure 16B:
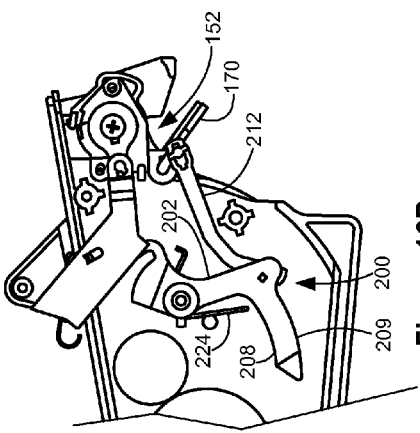
Figure 16C:
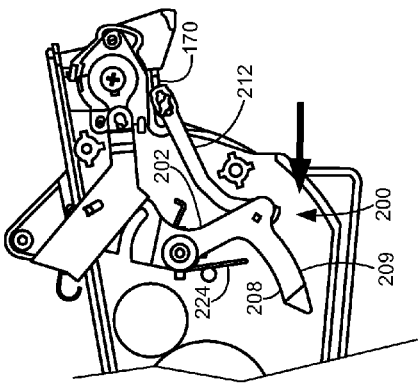
Figure 16D:
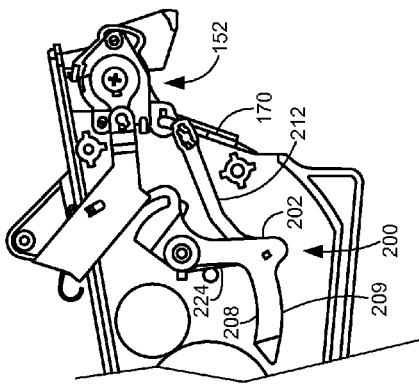
Figure 16E:
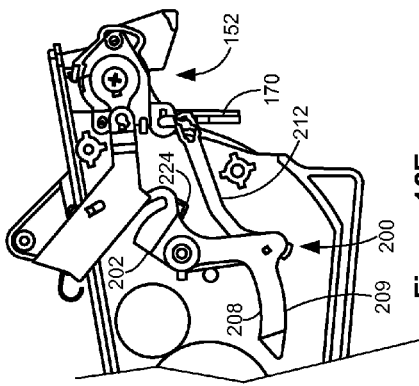
Figure 16F:
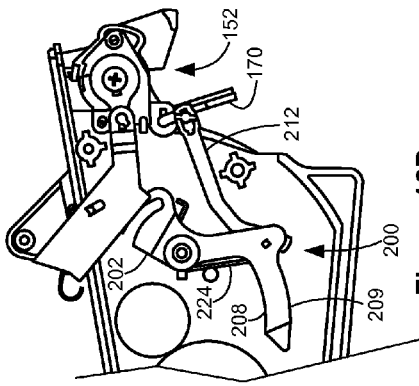

FIGS. 16A-F show sequential views of the opening of cover 170 using assembly 200. FIG. 16A shows cover 170 fully closed and pressed against exit port 152. When cover 170 is fully closed, post 234 is positioned against rear portion 230b (FIG. 15) of slot 230 in order to press cover 170 against exit port 152 as shown in FIG. 16A. As toner cartridge 100 is installed in image forming device 22, a fin 190 or other engagement feature that projects from frame 186 (see FIG. 2) is received in a slot 174 (see FIG. 10) in base 108 and/or end cap 120. As toner cartridge 100 is advanced further toward a mated position with imaging unit 180, fin 190 contacts engagement surface 209 of third leg 208 of linkage member 202 and applies a force in the direction of the arrow shown in FIG. 16A. The force from fin 190 on linkage member 202 overcomes the biasing force supplied by spring 224 and causes linkage member 202 to rotate in a clockwise direction (as viewed in FIGS. 16A-F) as toner cartridge 100 is advanced. As linkage member 202 rotates in the clockwise direction, lifting link 212 lowers which, in turn, causes cover 170 to pivot toward the open position. As shown in FIGS. 16B-E, as toner cartridge 100 is inserted further, cover 170 continues to pivot further toward the open position. FIG. 16E shows cover 170 in the open position with linkage member 202 fully rotated. If additional clearance is needed to prevent cover 170 from applying an undesired force on developer unit 182, e.g., due to differences in component tolerances, slot 230 provides additional travel for cover 170. For example, FIG. 16F shows cover 170 slid in slot 230 and retracted into recess 172 in front wall 114 (FIG. 12) in order to prevent the bias on cover 170 from affecting developer unit 182 (FIG. 14).

When toner cartridge 100 is removed from image forming device 22, this sequence is reversed such that the biasing force from spring 224 causes linkage member 202 to rotate in a counter-clockwise direction (as viewed in FIGS. 16A-F) which raises lifting link 212 causing cover 170 to pivot closed. End cap 120 shields assembly 200 from external interference. Slot 174 limits the access to linkage member 202 to reduce the likelihood that a user will inadvertently actuate linkage member 202 and release toner trapped by cover 170.

Figure 17:
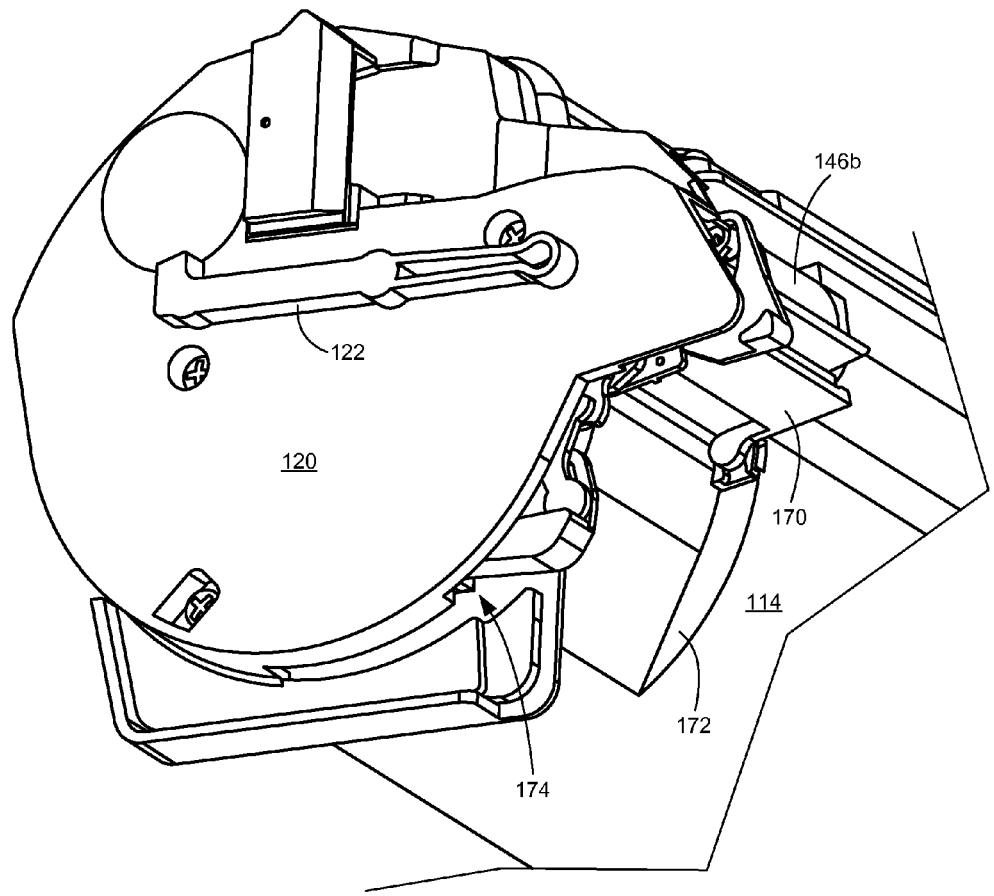
FIG. 17 is a perspective view of a toner cartridge having a pivoting exit port cover according to a second example embodiment.
Figure 18:
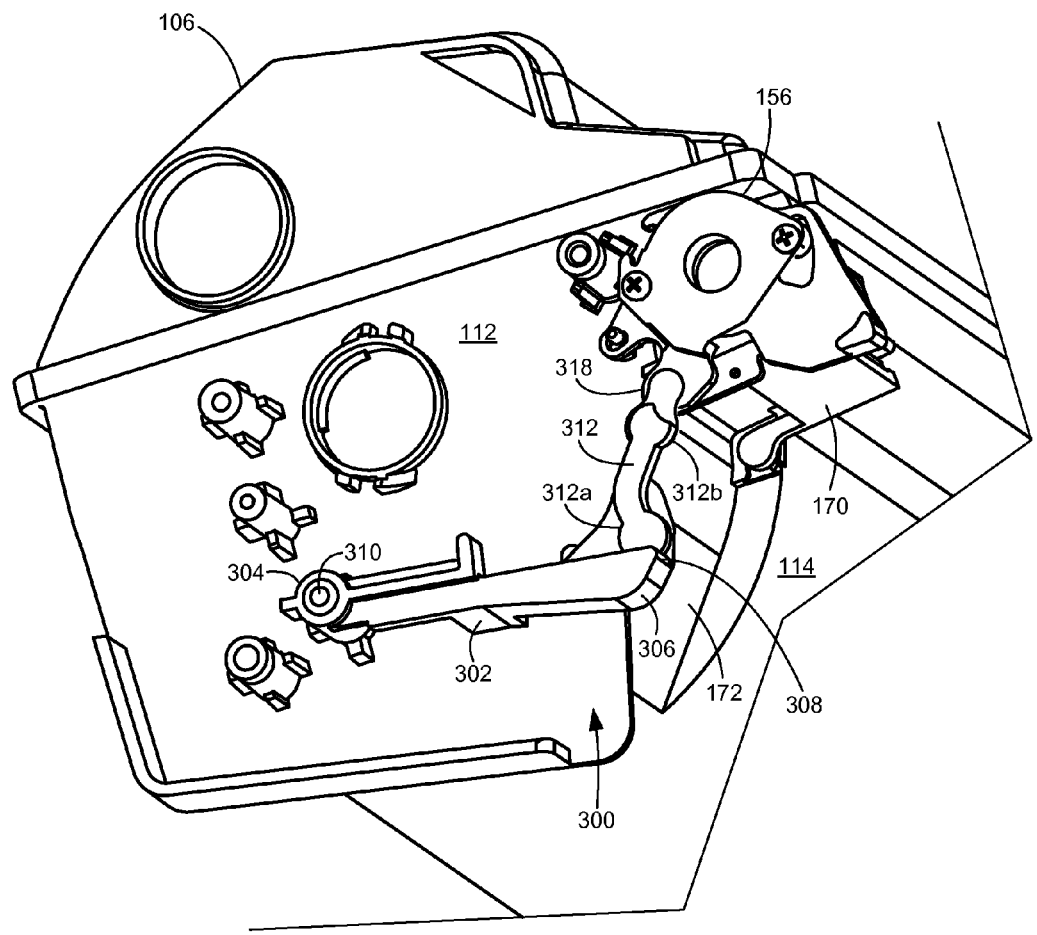
FIG. 18 is a perspective view of the toner cartridge shown in FIG. 17 with an end cap removed showing the cover in a closed position and an assembly for actuating the cover.
Figure 19:
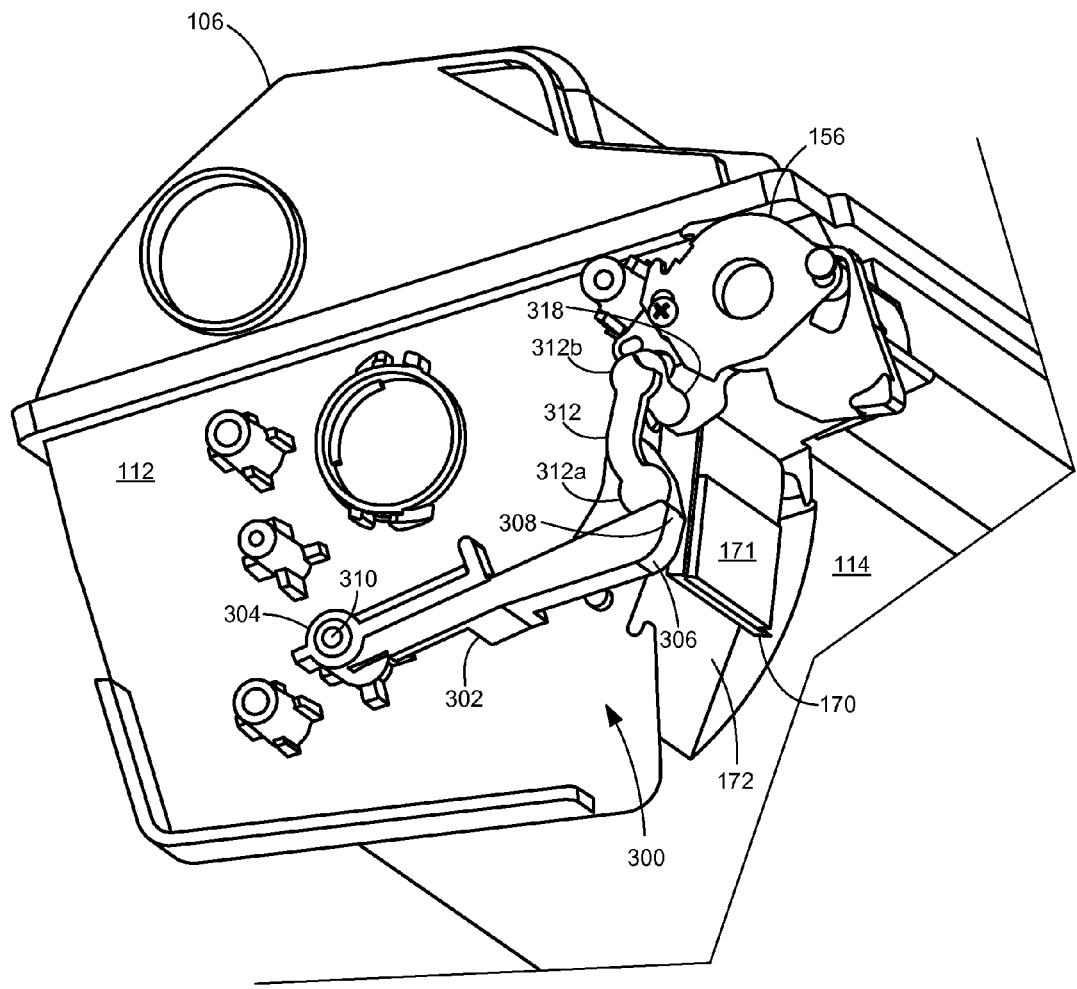
FIG. 19 is a perspective view of the toner cartridge shown in FIG. 17 with an end cap removed showing the cover in an open position and an assembly for actuating the cover.

FIGS. 17-19 show another example embodiment of an assembly 300 for actuating cover 170. As discussed above, cover 170 is pivotable between the closed position shown in FIGS. 17 and 18 and the open position shown in FIG. 19. FIGS. 18 and 19 show toner cartridge 100 with end cap 120 removed to more clearly illustrate the components housed between end cap 120 and side wall 112. Assembly 300 includes a raisable linkage member 302 that is pivotally attached at its first end 304 to side wall 112 at an axis of rotation 310. Linkage member 302 extends along side wall 112 from its attachment point toward front wall 114. Linkage member 302 includes a curved or ramped leading surface 306 that engages with fin 190 (or another engagement feature) that projects from frame 186 (see FIG. 2) when toner cartridge 100 is inserted into image forming device 22. A second end 308 of linkage member 302 is connected to a first end 312a of a lifting link 312. For example, first end 312a of lifting link 312 may include a post that is received by a corresponding channel in linkage member 302. As discussed above, the post may be rotatable within the channel to provide a greater range of motion between lifting link 312 and linkage member 302. However, it will be appreciated that linkage member 302 and lifting link 312 may be connected by any suitable means such as, for example, by reversing the post/channel configuration such that linkage member 302 includes a post and lifting link 312 includes a corresponding channel. Further, lifting link 312 and linkage member 302 may be connected at any suitable point along linkage member 302 or lifting link 312 as long as the rotation of linkage member 302 translates into the opening and closing of cover 170.

In the example embodiment illustrated, a rotation link 318 is connected to a second end 312b of lifting link 312. Rotation link 318 is in turn connected to cover 170 through retaining member 156. Rotation link 318 may be connected to lifting link 312 and cover 170 by any suitable means such as, for example, by a complementary post and channel configuration as discussed above with respect to linkage member 302 and lifting link 312. Further, lifting link 312 and rotation link 318 may be connected at any suitable point along lifting link 312 or rotation link 318 as long as the rotation of linkage member 302 translates into the opening and closing of cover 170.

A biasing member such as, for example, a spring (not shown) biases cover 170 toward the closed position. For example, a compression spring may apply a downward biasing force on linkage member 302 from above. Alternatively, an extension spring may apply a downward biasing force on linkage member 302 from below. However, it will be appreciated that one or more biasing members may be provided at any suitable location(s) in assembly 300 as desired. Side wall 112 and/or an inner surface of end cap 120 may include guide features to limit the travel of the components making up assembly 300 to ensure that they maintain their desired alignment.

Figure 20:
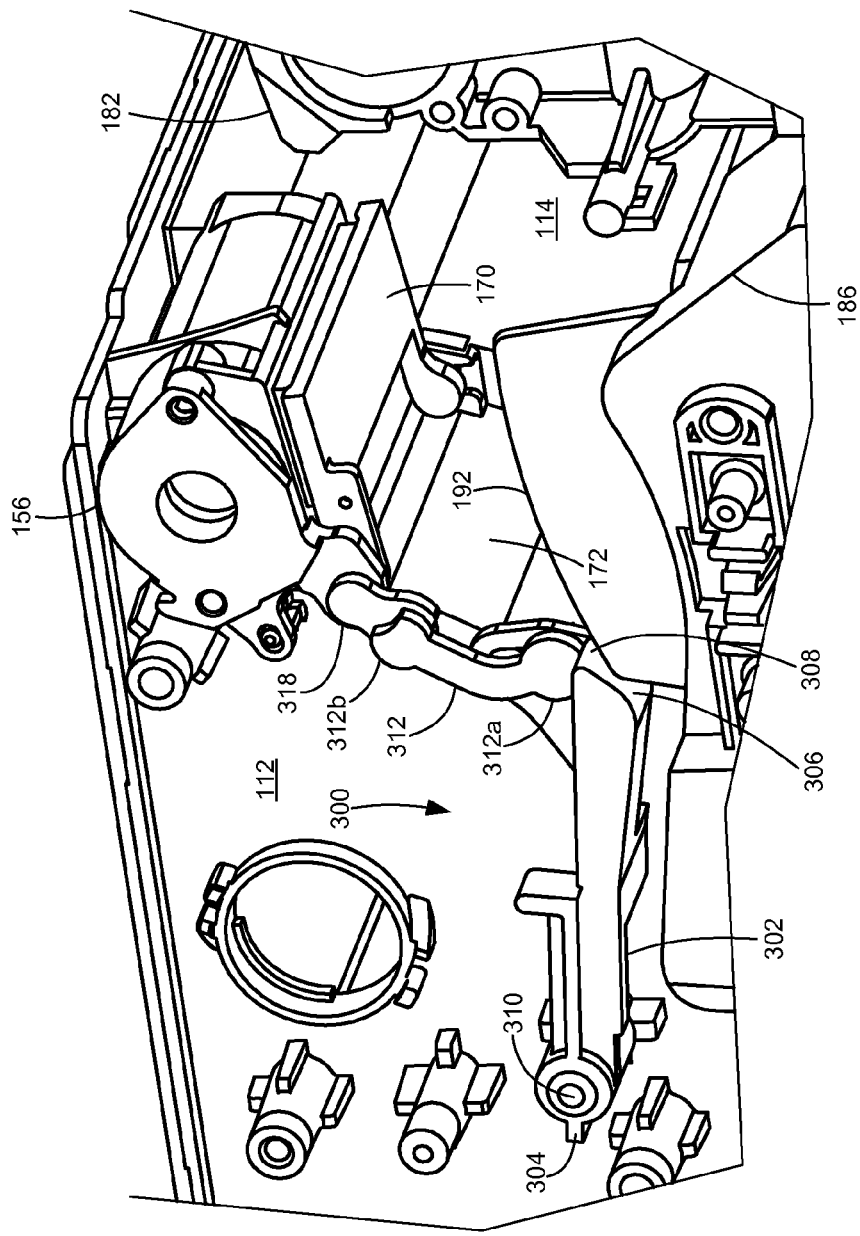
FIG. 20 is a perspective view of the toner cartridge and assembly shown in FIGS. 18 and 19 showing a camming surface on an imaging unit actuating the assembly.
Figure 21B:
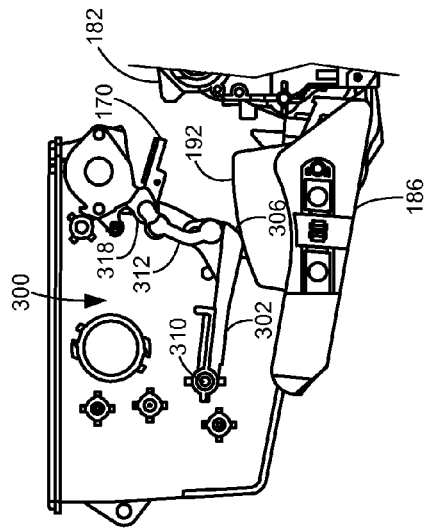
FIGS. 21A-D are sequential views showing the actuation of the assembly shown in FIGS. 18 and 19 to open the exit port cover.
Figure 21D:
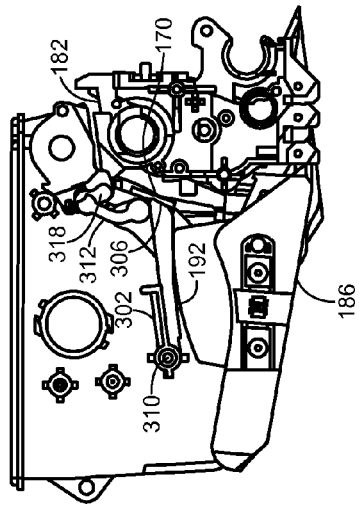
Figure 21A:
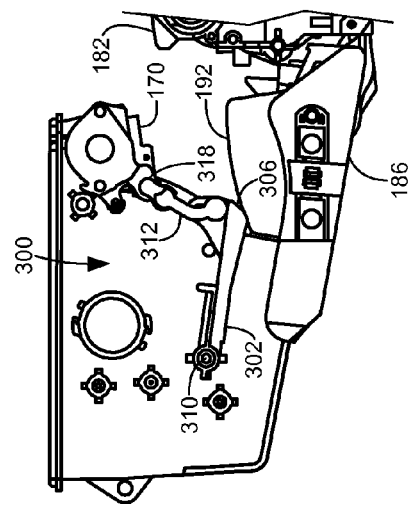
Figure 21C:
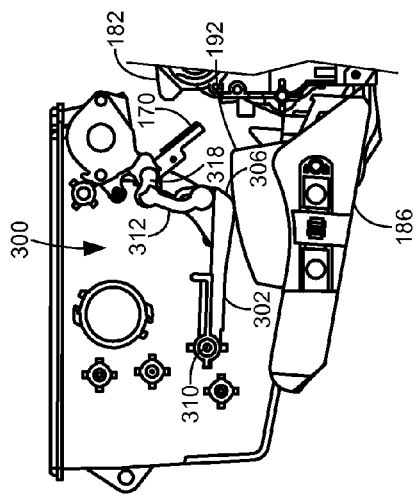

FIGS. 20 and 21A-D show sequential views of the opening of cover 170 using assembly 300. FIGS. 20 and 21A show cover 170 fully closed and pressed against exit port 152. As toner cartridge 100 is inserted into image forming device 22, a camming surface 192 on frame 186 of imaging unit 180 is received in slot 174 (see FIG. 17) in base 108 and/or end cap 120. As toner cartridge 100 is advanced, camming surface 192 contacts leading edge 306 of linkage member 302 and causes linkage member 302 to ramp upward along camming surface 192. The force from camming surface 192 overcomes the biasing force applied to linkage member 302. As linkage member 302 advances along camming surface 192, linkage member 302 pivots upward about its axis of rotation 310 causing lifting link 312 to raise as shown in FIGS. 21B-D. As lifting link 312 raises, rotation link 318 rotates causing cover 170 to pivot from the closed position to the open position. FIG. 21D shows cover 170 in the open position retracted into recess 172 (FIG. 17). As discussed above with respect to FIGS. 13-15, lifting link 312 may be modified as desired to include an elongated slot, such as slot 230 shown in FIGS. 13-15, in order to prevent cover 170 from applying an undesired force on developer unit 182. When toner cartridge 100 is removed from image forming device 22, this sequence is reversed such that the biasing force causes linkage member 302 to reverse along camming surface 192 which lowers lifting link 312 causing rotation link 318 to rotate cover 170 back into the closed position.

Figure 22:
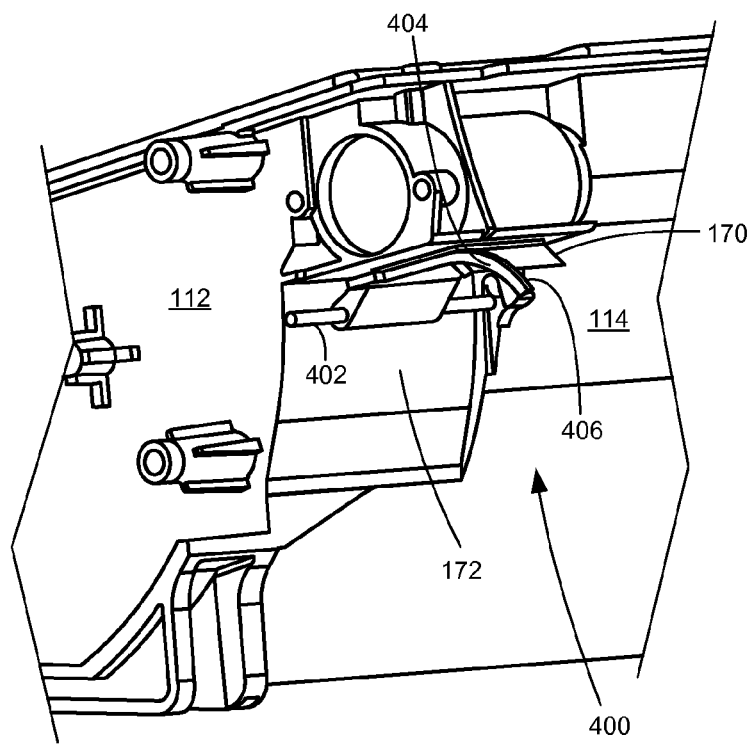
FIG. 22 is a perspective view of a toner cartridge having a pivoting exit port cover in a closed position according to a third example embodiment.
Figure 23:
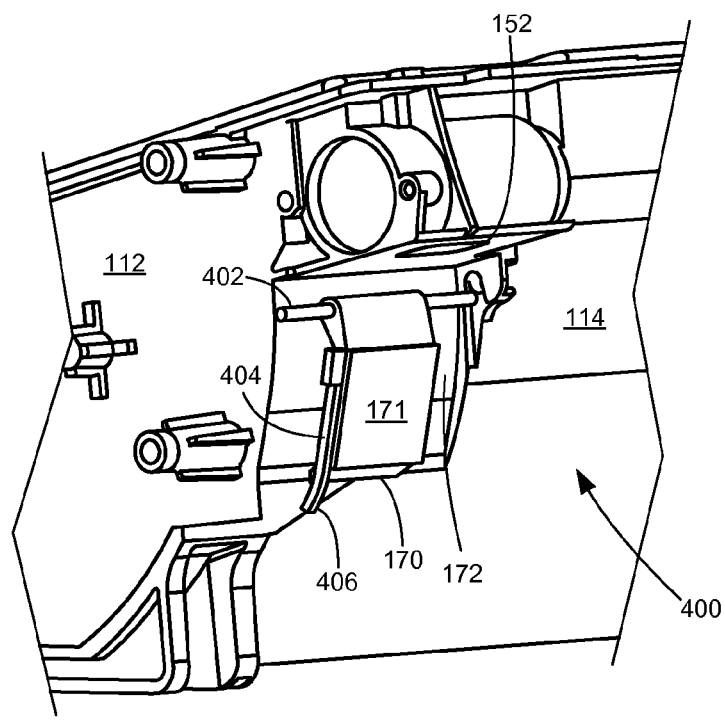
FIG. 23 is a perspective view of the toner cartridge shown in FIG. 22 showing the exit port cover in an open position.

FIGS. 22 and 23 show another example embodiment of an assembly 400 for actuating cover 170. As discussed above, cover 170 is pivotable between the closed position shown in FIG. 22 and the open position shown in FIG. 23. In this embodiment, cover 170 is pivotally attached to a rod 402 positioned on front wall 114. Cover 170 is shown in the open position having foam 171 positioned on an inner face thereof for soaking up excess toner. A biasing member such as, for example, a spring (not shown) biases cover 170 toward the closed position. For example, one or more torsion, compression or extension springs may be used as desired.

Cover 170 includes a finger 404 extending therefrom away from rod 402. Finger 404 curves away from exit port 152 (e.g., downward when cover 170 is in the closed position). In this embodiment, as toner cartridge 100 is inserted into image forming device 22, a leading surface 406 of finger 404 contacts developer unit 182 (FIG. 2). As toner cartridge 100 is advanced, the force from developer unit 182 on finger 404 overcomes the biasing force applied to cover 170. This causes cover 170 to pivot about rod 402 and open as toner cartridge 100 is advanced. Once toner cartridge 100 reaches its final position in image forming device 22 mated with developer unit 182, developer unit 182 retains cover 170 in the open position. When toner cartridge 100 is removed from image forming device 22, this sequence is reversed such that the biasing force causes cover 170 to return to the closed position as finger 404 separates from developer unit 182. One advantage of assembly 400 is its relative simplicity. However, unless a projection or other engagement feature on frame 186 or an interior portion of image forming device 22 is used to engage finger 404 and open to cover 170, cover 170 will apply a force on developer unit 182 when toner cartridge 100 is installed.

Accordingly, it will be appreciated that providing a pivotable exit port cover, such as cover 170, that is actuated when the toner cartridge is installed in image forming device 22 may be used to capture toner present in or around the exit port of the cartridge without scraping or skiving it into image forming device 22 thereby reducing the amount of toner leakage.

The foregoing description of several embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. A toner cartridge for use in an image forming device, comprising:
   a housing having a reservoir for containing toner therein, the housing having an exit port in fluid communication with the reservoir;
   a cover pivotable between a closed position blocking the exit port and an open position unblocking the exit port, the cover being biased toward the closed position; and
   an actuation mechanism operatively connected to the cover to open the cover upon being actuated by an engagement feature in the image forming device,
   wherein the cover blocks an outer portion of the exit port when the cover is in the closed position; and as the cover moves from the closed position to the open position, the cover moves away from the outer portion of the exit port outside of the housing.

2. The toner cartridge of claim 1, further comprising a foam member on an inner face of the cover to soak up residual toner.

3. The toner cartridge of claim 1, further comprising a slot in a front portion of the housing that allows the engagement feature to contact the actuation mechanism at a position closer to a bottom of the housing than the exit port and spaced from the exit port toward a side wall of the housing nearest the exit port as the toner cartridge is inserted in the image forming device.

4. The toner cartridge of claim 1, wherein the actuation mechanism includes a linkage member pivotally attached to a side wall of the housing and the linkage member is operatively connected to the cover such that rotation of the linkage member causes the cover to move between the open and closed positions.

5. The toner cartridge of claim 4, further comprising a link that connects the linkage member to the cover such that rotation of the linkage member raises or lowers the link causing the cover to move between the open and closed positions.

6. The toner cartridge of claim 5, further comprising an elongated slot in the link that receives a post extending from the cover, the width of the slot being greater than a diameter of the post such that the post is free to float within the slot.

7. The toner cartridge of claim 1, further comprising a shutter positioned at the exit port that is movable between an open position to permit toner from the reservoir to pass out of the exit port and a closed position to prevent toner from passing out of the exit port, the shutter being biased toward the closed position.

8. The toner cartridge of claim 1, wherein when the cover is in the open position, the cover is positioned closer to a bottom of the housing than the exit port.

9. The toner cartridge of claim 8, further comprising a recess on an exterior portion of the housing positioned closer to the bottom of the housing than the exit port that receives the cover when the cover is in the open position.

10. A toner cartridge for use in an image forming device having an imaging unit separate from the toner cartridge removably installed therein, the imaging unit including a developer unit, the toner cartridge comprising:
  a housing having a reservoir for containing toner therein;
  an exit port on a front portion of the housing in fluid communication with the reservoir;
  a cover pivotable between a closed position where the cover is pressed against an outer portion of the exit port to trap residual toner and an open position where the cover is pivoted away from the outer portion of the exit port outside of the housing to expose the exit port, the cover being biased toward the closed position;
  a foam member on an inner face of the cover to soak up residual toner; and
  an actuation mechanism attached to the housing and operatively connected to the cover,
  wherein when the toner cartridge is inserted in the image forming device, an engagement feature on the imaging unit engages the actuation mechanism causing the cover to pivot from the closed position to the open position.

11. The toner cartridge of claim 10, further comprising a slot in the front portion of the housing that allows the engagement feature to contact the actuation mechanism at a position closer to a bottom of the housing than the exit port and spaced from the exit port toward a side wall of the housing nearest the exit port as the toner cartridge is inserted in the image forming device.

12. The toner cartridge of claim 10, wherein the actuation mechanism includes a linkage member pivotally attached to a side wall of the housing and operatively connected to the cover; and when the toner cartridge is inserted in the image forming device, the engagement feature on the imaging unit causes the linkage member to rotate and open the cover.

13. The toner cartridge of claim 12, further comprising a link that connects the linkage member to the cover, wherein when the toner cartridge is inserted in the image forming device, the rotation of the linkage member raises or lowers the link to open the cover.

14. The toner cartridge of claim 13, further comprising an elongated slot in the link that receives a post extending from the cover, the width of the slot being greater than a diameter of the post such that the post is free to float within the slot.

15. The toner cartridge of claim 10, wherein when the toner cartridge is in its final position in the image forming device and the cover is in the open position, the cover is positioned outside of the housing closer to a bottom of the housing than the exit port and the cover is not biased against the developer unit.

16. The toner cartridge of claim 10, wherein when the cover is in the open position, the cover is positioned closer to a bottom of the housing than the exit port.

17. The toner cartridge of claim 16, further comprising a recess on the front portion of the housing positioned closer to the bottom of the housing than the exit port that receives the cover when the cover is in the open position.

18. A toner cartridge for use in an image forming device, comprising:
  a housing having a reservoir for containing toner therein;
  an exit port on a front portion of the housing in fluid communication with the reservoir for exiting toner from the reservoir;
  a cover pivotable between a closed position where a sealing face of the cover is pressed against an outer portion of the exit port to trap residual toner and an open position where the cover is pivoted away from the outer portion of the exit port with the sealing face of the cover positioned on an exterior of the cartridge facing away from the front portion of the housing, the cover being biased toward the closed position; and
  an actuation mechanism operatively connected to the cover to open the cover upon being actuated by an engagement feature in the image forming device.

19. The toner cartridge of claim 18, wherein when the cover is in the open position, the cover is positioned closer to a bottom of the housing than the exit port.

* * * * *